(12) United States Patent
Amendola

(10) Patent No.: US 8,568,683 B2
(45) Date of Patent: *Oct. 29, 2013

(54) METHOD FOR MAKING SILICON FOR SOLAR CELLS AND OTHER APPLICATIONS

(76) Inventor: Steven C. Amendola, Ocean, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,756

(22) Filed: Mar. 7, 2011

(65) Prior Publication Data

US 2011/0176984 A1    Jul. 21, 2011

Related U.S. Application Data

(63) Continuation of application No. 11/685,899, filed on Mar. 14, 2007, now Pat. No. 7,922,989.

(60) Provisional application No. 60/782,361, filed on Mar. 15, 2006.

(51) Int. Cl.
C01B 33/02 (2006.01)

(52) U.S. Cl.
USPC ............ 423/348; 423/324; 423/349; 423/350

(58) Field of Classification Search
USPC .................................. 423/324, 348, 349, 350
See application file for complete search history.

(56) References Cited

U.S. PATENT DOCUMENTS

| | | | |
|---|---|---|---|
| 3,887,359 A | 6/1975 | Enger et al. | |
| 3,887,460 A * | 6/1975 | Ward et al. | 210/683 |
| 3,984,526 A | 10/1976 | Haase et al. | |
| 4,067,746 A | 1/1978 | Wason et al. | |
| 4,120,938 A | 10/1978 | Hasse et al. | |
| 4,127,641 A | 11/1978 | Aldcroft et al. | |
| 4,214,920 A * | 7/1980 | Amick et al. | 438/57 |
| 4,247,528 A | 1/1981 | Dodaj et al. | |
| 4,304,763 A | 12/1981 | Dietl et al. | |
| 4,312,850 A * | 1/1982 | Dietl et al. | 423/350 |
| 4,336,235 A | 6/1982 | Deabriges | |
| 4,460,556 A * | 7/1984 | Aulich et al. | 423/350 |
| 4,505,883 A | 3/1985 | Vite et al. | |
| 4,525,334 A | 6/1985 | Woditsch et al. | |
| 4,676,953 A | 6/1987 | Jeromin et al. | |
| 4,676,964 A | 6/1987 | Seki et al. | |
| 4,678,652 A * | 7/1987 | Tamenori et al. | 423/339 |
| 4,683,128 A | 7/1987 | Orii et al. | |
| 4,702,902 A | 10/1987 | Dosaj et al. | |
| 4,755,298 A | 7/1988 | Grinstead | |

(Continued)

FOREIGN PATENT DOCUMENTS

| | | |
|---|---|---|
| EP | 0177894 | 4/1986 |
| FR | 2636938 | 3/1990 |

(Continued)

OTHER PUBLICATIONS

Co-Pending U.S. Appl. No. 11/685,899, filed Mar. 14, 2007.

(Continued)

*Primary Examiner* — Paul Wartalowicz
(74) *Attorney, Agent, or Firm* — Baker Botts L.L.P.

(57) ABSTRACT

A method for preparation of high purity silicon suitable for photovoltaic cells using reduction of silica, which is pre-purified in an aqueous solution, in presence of a reducing agent, preferably carbonaceous agent, where the pre-purified silica has a low amount of boron suitable for photovoltaic cells is described.

10 Claims, 3 Drawing Sheets

(56) References Cited

U.S. PATENT DOCUMENTS

| | | | |
|---|---|---|---|
| 4,853,198 A * | 8/1989 | Orii et al. | 423/335 |
| 4,857,289 A | 8/1989 | Nauroth et al. | |
| 4,857,290 A * | 8/1989 | Shimizu | 423/339 |
| 4,865,643 A | 9/1989 | Goins, Jr. et al. | |
| 4,885,149 A * | 12/1989 | De Freitas et al. | 423/339 |
| 4,971,772 A * | 11/1990 | Aulich et al. | 422/241 |
| 4,973,462 A | 11/1990 | Akira et al. | |
| 4,981,668 A | 1/1991 | Dosaj et al. | |
| 5,000,933 A | 3/1991 | Novotny et al. | |
| 5,009,703 A * | 4/1991 | Arvidson et al. | 75/10.36 |
| 5,084,262 A | 1/1992 | Novotny et al. | |
| 5,174,982 A * | 12/1992 | Dosaj et al. | 423/350 |
| 5,208,001 A | 5/1993 | Truitt et al. | |
| 5,229,095 A | 7/1993 | Schimmel et al. | |
| 5,236,682 A | 8/1993 | Schimmel et al. | |
| 5,346,678 A | 9/1994 | Phillips et al. | |
| 5,484,581 A | 1/1996 | Esch et al. | |
| 5,589,150 A | 12/1996 | Kano et al. | |
| 6,090,361 A | 7/2000 | Baba et al. | |
| 6,090,734 A | 7/2000 | Tsipursky et al. | |
| 6,132,618 A | 10/2000 | Bass et al. | |
| 6,849,797 B2 | 2/2005 | Koyanagi et al. | |
| 7,071,489 B2 * | 7/2006 | Tsukuda | 257/75 |
| 7,125,455 B2 | 10/2006 | Costesso et al. | |
| 7,297,318 B2 * | 11/2007 | Huang et al. | 423/326 |
| 2004/0247512 A1 | 12/2004 | Kondo et al. | |
| 2005/0074388 A1 | 4/2005 | Baluais et al. | |
| 2005/0227868 A1 * | 10/2005 | Hinman et al. | 502/408 |

FOREIGN PATENT DOCUMENTS

| | | |
|---|---|---|
| GB | 1214020 | 11/1970 |
| GB | 02004770 | 4/1979 |
| JP | S58-172219 | 10/1983 |
| JP | 60-022934 | 2/1985 |
| JP | S60-090811 A | 5/1985 |
| JP | 6024613 | 10/1985 |
| JP | 61286212 | 12/1986 |
| JP | S63-46005 | 9/1988 |
| JP | 02311310 | 12/1990 |
| JP | 07242411 | 9/1995 |
| JP | 11-189408 | 7/1997 |
| JP | 2002241122 | 8/2002 |
| JP | 2003104716 | 4/2003 |
| JP | 2003146646 | 5/2003 |
| WO | WO96/25522 | 8/1996 |

OTHER PUBLICATIONS

U.S. Appl. No. 11/685,899, Dec. 9, 2010 Notice of Allowance.
U.S. Appl. No. 11/685,899, Sep. 21, 2010 Response to Non-Final Office Action.
U.S. Appl. No. 11/685,899, Mar. 29, 2010 Non-Final Office Action.
U.S. Appl. No. 11/685,899, Jul. 6, 2007 Preliminary Amendment.
Certified Translation of Reference Material About JP 2009-500595.
Aulich et al., "Solar-grade silicon prepared by carbothermic reduction of silica", JPL Proceedings of the Flat-Plate Solar Array Project Workshop on Low-Cost Polysilicon for Terrestrial Photovoltaic Solar-Cell Applications, Feb. 1986, p. 267-275 (SEE N86-26679 17-44).
Kozawa et al., "Purification of Graphite. I. Removal of Vanadium by Chlorine Gas Treatment," Bull. of Chem. Soc. of Japan, 29(1), 1956, 192-193.
Wisander, Donald W., et al., "Effect of Chlorine Purification on Oxidation Resistance of Some Mechanical Carbons", NASA Technical Note, TN 0-7688, Jun. 1974.
Souza et al., "Rice Hull-Derived Silica: Applications in Portland Cement and Mullite Whiskers", Mat. Res. vol. 3 n. 2 Sao Carlos Apr. 2000; Materials Research, Print ISSN 1516-1439.
http://en.wikipedia.org/wiki/Electric_arc_furnace.
Dow Corning Corporation, "Solar Silicon via the Dow Corning Process", Final Report, 1979; Technical Report of a NASA Sponsored project; NASA-CR 157418 or 15706; DOE/JPL-954559-78/5; ISSN: 0565-7059.
http://en.wikipedia.org/wiki/Refractory.
Garbers-Craig, "Presidential Address: How cool are refractory materials?", J. Southern African Institute of Mining and Metallurgy, vol. 108, 2008, 1-16.
http://www.siliconfareast.com/oxidation.htm.
Encyclopedia Britannica Online: Entry for "rare-earth element" in production and application> preparation of pure metals> early metal reduction methods (Oct. 1, 2009).
Wailes, "Glass Making Easy at Home/or Chemists" (Oct. 1934), Popular Science, see also: http://blog.modernmechanix.com/2007/11/20/glas-making-easy-for-home-chemists/.
Lewin, "Silicon II. Properties and Occurrence [of silicon]: Silicon", Microsoft® Encarta® Online Encyclopedia 2009.
http://en.wikipedia.org/wiki/Carbohydrate.
Bathey et al., "Review Solar-grade silicon," J. of Mat. Science, 17, 1982, 3077-3096.
Hunt et al. "Progress on the Dow Corning Process for Sola-Grade Silicon", 2nd EC Photovoltaic Solar Energy Conference, edited by R. Van Overstraeten (D.Reidel), West Berlin, 1979, 98-105.
http://en.wikipedia.org/wiki/Pyrolytic_carbon.
http://en.wikipedia.org/wiki/Graphite.
http://en.wikipedia.org/wiki/Quartz.
Istratov et al., "Control of metal impurities in "dirty" multicrystalline silicon for solar cells", Material Science and Engineering, B 134, 2006, 282-286.
Uusitalo et al., "Phosphorous in Runoff Assessed by Anion Exchange Resin Extraction and an Algal Assay", J. Environm. Qual., 32, 2003, 633-641.
Taniai, et al., 61(6) "On-line preconcentration of phosphate onto molybdate from anion exchange column", Talanta, vol. 61, Issue 6, 2003, 905-912 (2003).
Tanaka et al., "Colorimetric determination of phosphate ion using anion exchange resin of molybdate from", Japanese analysis, 28(1), 1979, 43-47.
Foletto et al., "Conversion of rice hull ash into soluble sodium silicate" Mat. Res. (on line), 9(3), 2006, 1-10.
Shul'ga et al., "Increasing Furnace Capacity for producing granulated sodium silicate", Keramika, 5, 1969, 41.
Xei et al., "Study on New Sensitive Methods of Determination of Phosphorous by Solid Phase Spectroscopy," Chinese Chem. Let., 11(7) 609-612 (2000).
Real et al., "Preparation of Silica from Rice Husks," J. Am. Ceram. Soc., v. 79, n. 8, p. 2012, 1996.
Tolstoguzov, N.V., Mechanism and a Model of the Carbothermic Reduction of Sillica in the Manufacture of Silicon, Stal[1] (May 1989) vol. 5, pp. 36-40.
Author Batra et al.,On Reduction of silica by carbon at 1500 and 1600 deg c., Transactions of the Indian Institute of Metals (Apr.-Jun. 1997) vil.50, (2-3) pp. 213-217.

* cited by examiner

METHOD FOR MAKING SILICON FOR SOLAR CELLS AND OTHER APPLICATIONS

CROSS-REFERENCE TO RELATED APPLICATIONS

This application is a continuation of U.S. application Ser. No. 11/685,899 filed on Mar. 14, 2007 now U.S. Pat. No. 7,922,989 which claims priority under 35 U.S.C. §119, based on U.S. Provisional Application Ser. No. 60/782,361, filed Mar. 15, 2006. The teachings of these referenced applications are incorporated herein by reference in their entireties.

BACKGROUND OF THE INVENTION

Rising energy costs and stretched power grids as well as a desire for energy independence has sparked a recent surge in the use of solar panels (photovoltaic) to make electricity. Currently, over 90% of solar cells in the market use silicon. However, the lack of an intermediate grade of silicon has hampered the growth of the silicon solar industry. Until recent years, the total demand of silicon for solar cells was small enough to be sufficient sustained by left over scrap silicon from the electronics and semiconductor industry. The new demand, however, has completely outstripped such source of silicon.

Currently, there are two grades of silicon. There is a metallurgical grade (MG) used by the steel and metals industry as an alloying material. This material is made from relatively crude materials (sand and coal or coke) and yields a cheap source of silicon at about 98-99% purity. This is not pure enough for solar grade (SoG) silicon that requires about 99.999% (5,9's) or 99.9999% (6,9's). Some companies (such as Elkem) produce higher purity MG silicon by using aluminum instead of carbon as the reducing agent. This material is often used to make electronic or semiconductor grade silicon which is better than 99.999999% (8,9's) pure.

The method to make 8,9's silicon is called the Siemens process, which uses MG silicon as a starting material. The process is very capital intensive and expensive to run and causes Siemen's silicon to be very expensive. Solar cells require very large area of silicon to absorb sunlight so that the cost associated with 8,9' silicon in solar cells is prohibitive. Silicon produced as waste material during the preparation of the 8,9's silicon often meets the SoG silicon specifications. However, the electronic industry only produces about 4,000 tons per year of such scrap silicon, which cannot meet the current demand for solar silicon, e.g., over 10,000 tons per year.

Much effort has been expended to try to upgrade MG silicon to SoG silicon. The Siemens process does this chemically by reacting MG silicon with HCl at high temperature. This produces a family of chloro-silanes and other impurities that are then rigorously distilled and purified until only a very pure stream of trichlorosilane remains. This material with hydrogen added is decomposed over high purity silicon heated silicon to decompose mixture to pure (8,9's) silicon and HCl.

However, solar cells can be made with silicon of a lesser purity. If a specific process aimed at the 6,9's purity level were developed for SoG silicon then the solar industry could resume its growth while maintaining a competitive edge for electrical generation costs.

Much effort has been put into starting with MG silicon and upgrading it. The Siemens process does this chemically. Many attempts have been made to use pyrometallurgical processes. However, dealing with molten silicon is difficult and the number of selective tools for purification is few. These tools are primarily, gas reactions, fluxing with solid or molten materials and various methods of direction solidification. All of these methods have their limitations and to date no combination of these methods has produced a viable commercial method that is used by any manufacturer of silicon. The one partial success is the HEM (Heat Exchanger Method) which is a directional solidification method used to increase the purity of bulk silicon. However, this method is not useful for upgrading MG silicon to SoG silicon. At this time the largest furnaces available produce about 200 kilograms of useable silicon every 50 to 60 hours. The method is slow and consumes much energy. Further, the technique depends on materials (being removed) having a partition coefficient significantly less than 1 (typically below 0.1 to be effective). While many materials do have low partition coefficients for the solubility difference in molten verses solid silicon, this method removes many impurities. However, two materials, boron and phosphorus, are particularly deleterious to solar cells and also have high partition coefficient (0.8 for boron) and 0.35 for phosphorus. Thus, the HEM method (a directional solidification method) is not a suitable way to purify silicon if these contaminants are present in an amount above the final desired tolerable limits. Almost all MG grade silicon has boron contents (typically >100 ppm) well above the requirements of a few part per million or less. For a high quality photovoltaic cells, silicon having a boron content of about 1 ppm or less is often required.

In summary, there is no economical source of solar grade silicon. Metallurgical silicon is too impure and semiconductor silicon is too expensive.

SUMMARY OF THE INVENTION

The present invention relates to a method for preparing high purity silicon suitable for photovoltaic cells using reduction of silica, which is pre-purified in an aqueous solution, in presence of a reducing agent, preferably carbonaceous agent, where the pre-purified silica has a low amount of boron suitable for photovoltaic cells, preferably about 5 ppm or less, more preferably about 3 ppm or less, even more preferably about 1 ppm or less or less than 1 ppm, even further preferably less than 0.5 ppm. The pre-purified silica is preferably obtained by contacting the aqueous silica solution of a water soluble form of silica, preferably alkali silicate, more preferably sodium silicate or potassium silicate, with a boron removing agent, preferably a boron specific chelating resin, even more preferably, an ion exchange resin having a functional group of N-methylglucamine. The aqueous solution may also be treated with phosphorus removing agent, preferably a transition metal, calcium, or magnesium, or with molybdate salt or molybdate salt treated anion resin. The carbonaceous agent is activated carbon or carbon black preferably substantially free of boron and phosphorus, more preferably having a boron content of about 1 ppm or less.

In another embodiment, the present invention relates to a method for preparing high purity silicon including obtaining an aqueous silica solution; filtering the solution; contacting the filtrate with an boron specific ion resin column; converting the silicate to silica; reducing the silica with carbon having low content of boron and phosphorous in a furnace; and cooling the resulted molten high purity silicon.

In another embodiment, the present invention relates to a method preparing high purity silica having low B and P contents where the method includes obtaining aqueous silicate solution; optionally adding a transit metal, calcium, or magnesium; filtering the solution; contacting the filtrate with an boron specific ion resin column; removing the water; and converting the resulted silicate salt to silica.

In another embodiment, the present invention relates to purifying low grade silicon to high purity silicon suitable for photovoltaic cells by converting the low grade silicon to a water soluble form; purifying the water soluble form of silica in an aqueous solution; converting the purified water soluble form of silica to silica; and converting the resulting silica to the high purity silicon

DESCRIPTION OF THE INVENTION

Figure 1:
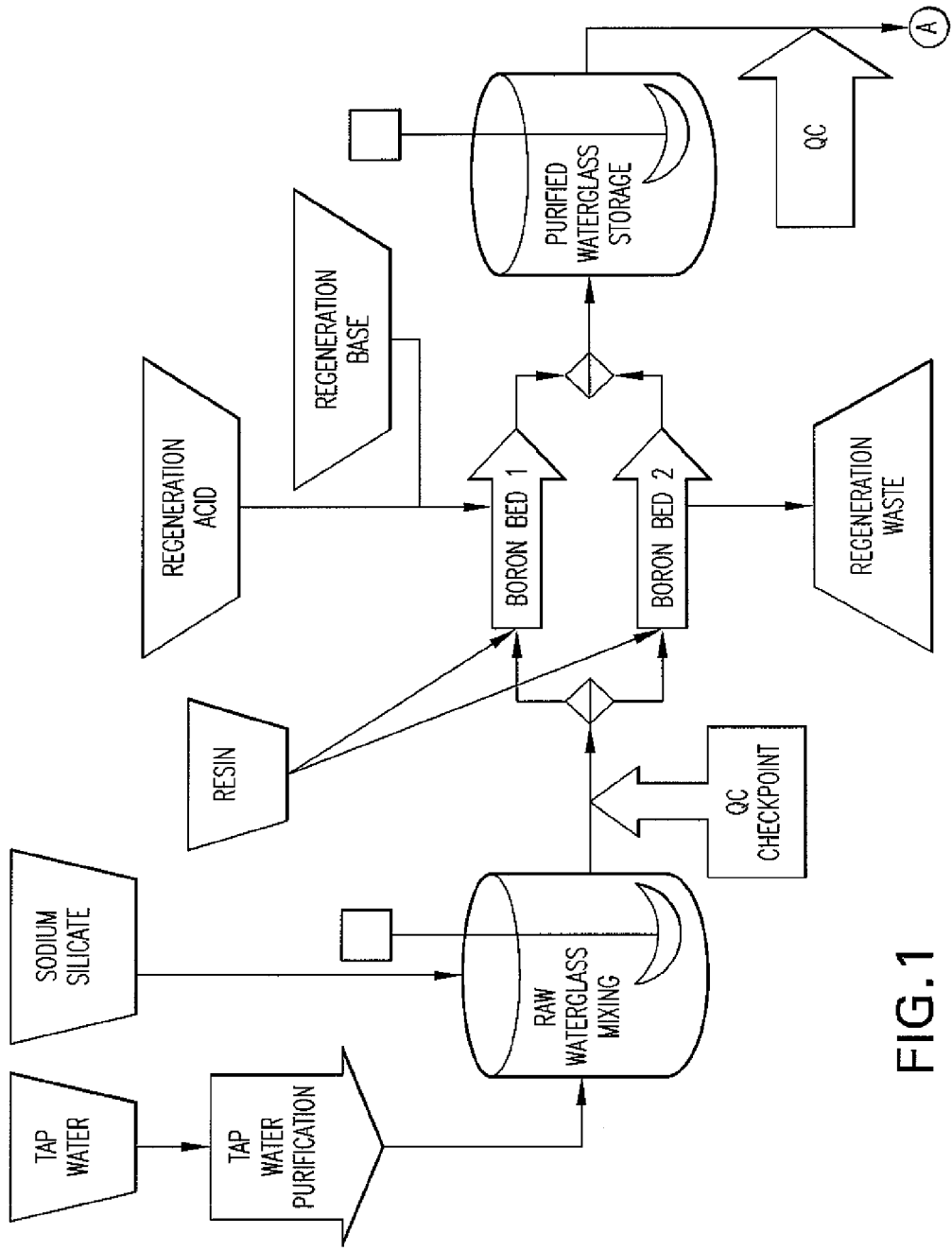
FIG. 1 is a part of an illustrative process flow diagram showing an exemplary silicon production process employing the present invention.
Figure 2:
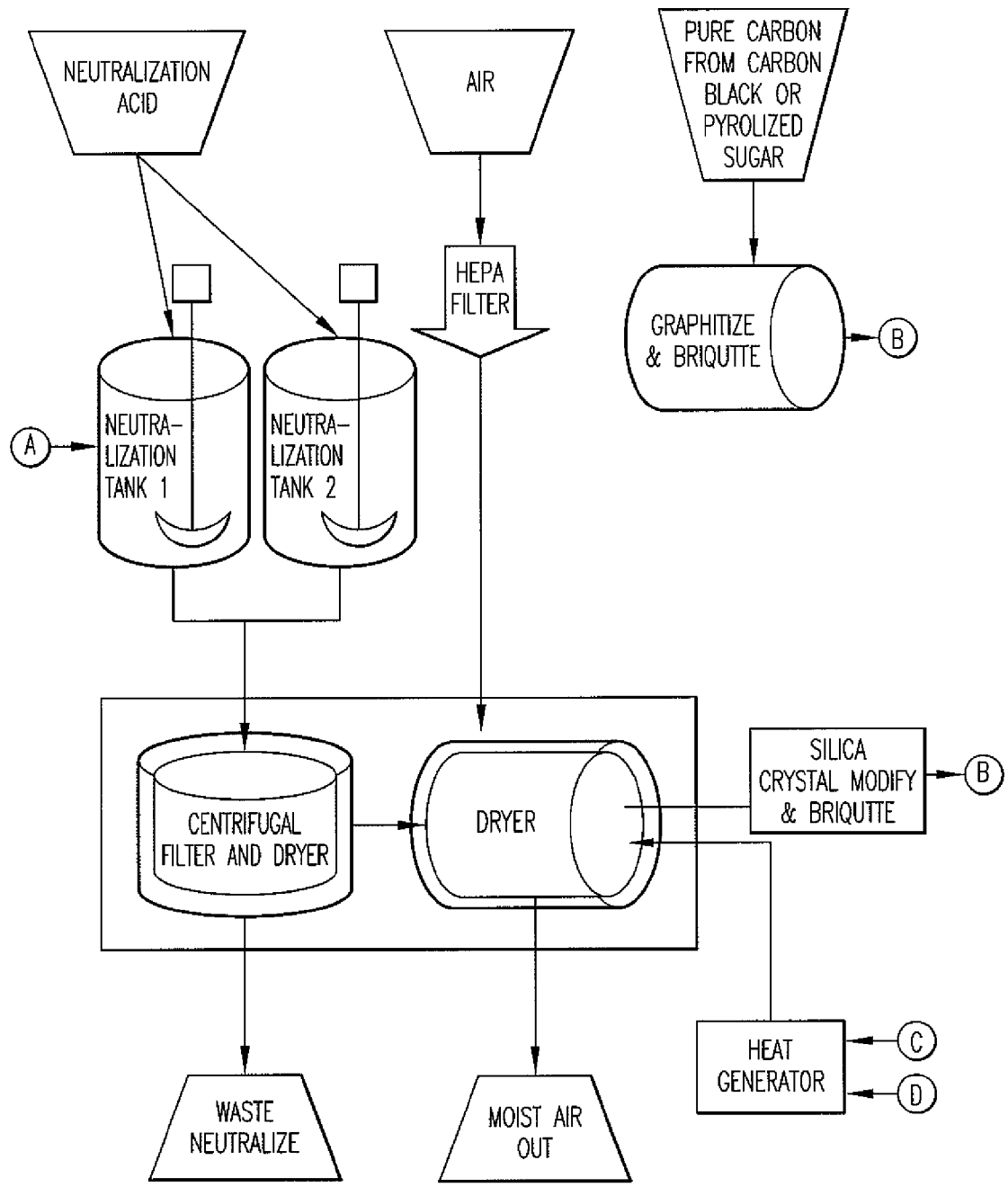
FIG. 2 is the second part of the illustrative process flow diagram of FIG. 1.
Figure 3:
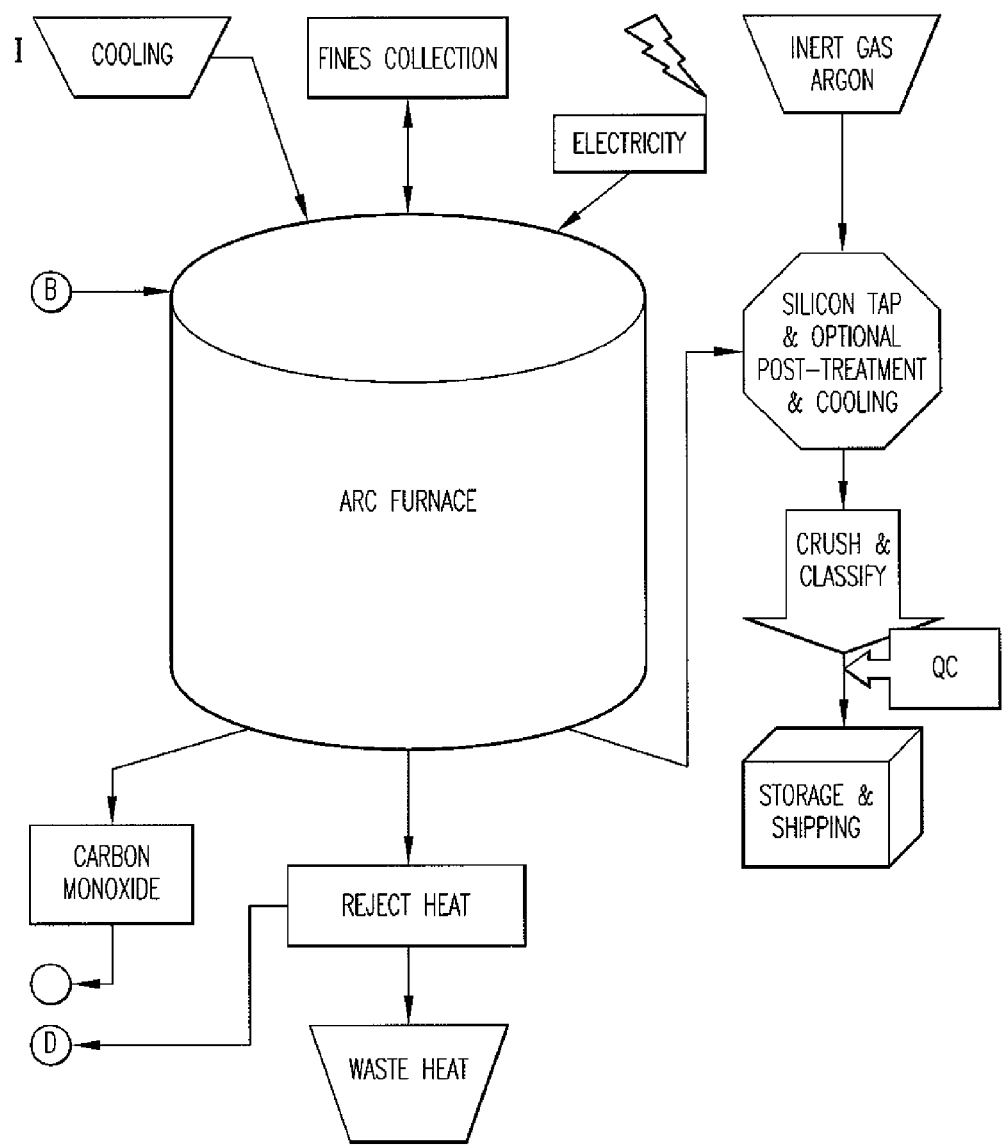
FIG. 3 is the third part of the illustrative process flow diagram of FIG. 1.

What has been overlooked to date is the fact that chemical purifications are much more easily and economically accomplished in the aqueous phase. No method to date has proposed pre-purification of the ingredients used in making the silicon. While there have been proposals to use higher purity compounds (such as quartzite instead of sand), there is no treatment of these materials and it turns out that the natural sources, while potentially purer are not pure enough over the long term as there can often be inclusions of many minerals, that are sufficient to exceed the B and P purity requirements.

MG Silicon is made (and has been made for over 100 years) by reaction 1 below: (at about 1700 C)

$$SiO_2 + 2C \rightarrow Si + 2CO \qquad (1)$$

Reaction 1 is rather simplified and there are several intermediates and other side reactions as listed below that can occur.

$$SiO_2 + 2C \rightarrow Si + 2CO \qquad (2)$$

$$SiO_2 + 3C \rightarrow SiC + 2CO \qquad (3)$$

$$SiO_2 + C \rightarrow SiO + CO \qquad (4)$$

$$SiO + C \rightarrow Si + CO \qquad (5)$$

$$SiO + SiC \rightarrow Si + CO \qquad (6)$$

The above reactions are typical of carbothermal reduction. The product of reactions 1-6 is usually about 98-99% purity.

Silicon can also be made by replacing the carbon with a sufficiently active metal (or alloy) such as magnesium or aluminum.

The reaction then becomes $$3SiO_2 + 4Al \rightarrow 3Si + 2Al_2O_3 \qquad (7)$$

This reaction is used to make a slightly higher grade of MG silicon (about 99.9% and is used as a source of silicon for the Siemens process) but aluminum is somewhat more expensive than carbon. Further, the source of silica is still a key source for impurities such as boron. Once, the impurities are put in the furnace they will be incorporated in the silicon, as boron is not volatile, even at these high temperatures. Reaction 7 is referred to as an aluminothermic reduction. It is to be understood that there is no theoretical reason (although there clearly are practical reasons which are addressed by this process) why the carbothermal (or metalothermic) reaction should not make a high purity material. If the impurity is not put in the furnace in the first place it will not appear in the finished product. If pure materials are charged into a clean furnace that is dedicated to only making high purity silicon then the only other source of impurities would come from the furnace liner or carbon rods. By choosing the correct material for the furnace liner this source of impurity is also eliminated. Thus, graphite, or silica that are already in the raw materials or other compounds that do not have an interact with molten silicon or the starting materials such as alumina, alumina chromite, silicon nitride, orsilicon carbide, are typical of available compounds that can be used for crucibles or brick type liners. Additional materials such as thorium oxide, zirconium oxide, zirconium nitride or various zirconates are also suitable. Any suitable furnace may be used. However, the design must allow for the exclusion of air and allow an inert atmosphere.

Typical furnaces used by industry are electric arc, induction or calciners. MG silicon is made using submerged electric arc furnaces. Since electric arc uses graphite (carbon) electrodes that do come into contact with the silicon, the purity of the electrode needs to be high so that impurities cannot come from the electrodes. Such electrodes are available from UCAR and Graftek. In an induction furnace, heat is transferred in via an A.C. electric field either directly to the material or through a conductive susceptor such as graphite. Again, the material holding the molten silicon must be clean and made of suitable materials such as listed above.

In a calciner a rotating tube is heated indirectly by either electric elements and or a flame source. Again, the material that the tube is made from must not impart impurities to the silicon.

Any suitable furnace will be acceptable for use in this invention as outlined above. Preferably, the furnace is the bottom-tapped submerged arc furnace.

The key to the high purity is to create high purity silica from an aqueous system. For example, a water-soluble silicate such as sodium silicate is obtained. This can be purchased or made by the reaction of soda ash and silica at high temperature by the following reaction:

$$Na_2CO_3 + SiO_2 \rightarrow Na_2SiO_3 + CO_2 \qquad (8)$$

Sodium silicate may also be made directly in an aqueous solution by reaction of sodium hydroxide and silica as below:

$$2NaOH + SiO_2 \rightarrow Na_2SiO_3 + H_2O \qquad (9)$$

Of course, other suitable carbonates or hydroxides may also be used such as potassium hydroxide, potassium carbonate or any other cation that produces a soluble silicate.

The silicate solution is then cleaned to get any undesirable impurities out. This can be accomplished by a variety of different operations.

Typically the solution is filtered to remove any insoluble matter. The solution is tested for various elemental impurities. Of special interest is of course boron and phosphorus. Any suitable testing method is acceptable. The silicate solution will be at a rather high pH. Silicates are also poor complexing agents. Thus most metals will have very low solubility in the silicate solution and will be removed during the initial filtration step. These metals will include most transition elements such as iron, nickel, zinc, and cobalt as well as calcium and magnesium. However, if desired, a polishing step with an alkali metal ion such as sodium or proton or ammonium charged cation exchanger can employed to remove some final elements especially multivalent cations that are attracted more strongly to many cation exchange resins than sodium is.

Boron in the solution will be in the form of borates. Such boron can be removed by using a boron chelating agent, preferably an ion exchange resin having a functional group of N-methylglucamine. For example, Amberlite®IRA-743, sold by Rohm & Haas having Corporate Headquarters at 100 Independence Mall West, Philadelphia, Pa., is a borate specific chelating resin. It functions well at basic pH as well. It has a high affinity for borate without affecting the silicate. The resin can be easily regenerated in a two step method as required by using sulfuric acid and aqua ammonia. The borate is removed as boric acid. The resin is rinsed with DI water (de-ionized water) and can be reused. Multiple columns may be used in series to get any desired purity level of boron. Standard techniques for ion exchange apply to all IX methods mentioned in this disclosure.

The pre-purified silica should have a low boron content suitable for photovoltaic cells. Although one of skill in the art would be able to determine what is the low boron content suitable for photovoltaic cells in view of the industrial standards in the field of photovoltaic cells at the time of this application. However, a preferable low boron content is about 5 ppm or less, more preferably about 3 ppm or less, even more preferably 1 ppm or less, or less than 1 ppm, further preferably about 0.5 ppm or less.

If traces of transition elements or magnesium or calcium are present, much of the phosphorus will be precipitated and be removed by the filtration step. It is also possible to intentionally add certain material to encourage this precipitation but small amounts of silicate may also be lost. If the amount of phosphorus in the solution is high, it can be eliminated by using an anion resin that is treated with ammonium molybdate or the tungstate and then rinsed. Such a column will specifically absorb phosphate in a basic solution. The resin dispensed with molybdate salts or molybdate salts themselves can be used. However, when the unattached salts are used, the molybdate could pass into the solution although they can be easily removed by an anion resin. Using the treated anion resin can reduce a step. Any other conventional methods to remove B or P or any elements may also be applied.

All of the above should be preformed in containers made from materials that do not leach boron like, for example, borosilicate glass does. So most conventional plastics and many metals such as stainless steel are suitable receptacles for the silicate solution.

The sodium silicate solution after being treated as above is now ready to be used. Heating of this solution and/or the addition of acid or other chemicals will start the formation and precipitation of pure silica usually as a gel. The silica is precipitated washed and dried. The silica maybe washed and dried using conventional equipment such as centrifuges, filter presses and the like. The silica may additionally be processed through a furnace to create the desired crystal forms of silica such as cristobalite, tridymite, quartz, lechatelierite or amorphous which may be desirable for the reduction step.

Next is to consider the carbonaceous agent for use in this process. The carbonaceous agent is preferably substantially free of boron and phosphorus and includes activated carbon or carbon black. If the carbonaceous agent causes silicon made from the pre-purified silica to have boron and/or phosphorus contents beyond the acceptable amounts for photovoltaic cells, the carbonaceous agent would not be substantially free of boron and phosphorus. Also various forms of carbon are known to be quite pure. Such commercially available forms are carbon blacks that can be made from natural gas, ethylene or acetylene. Carbon blacks made from residual oils will contain undesirable impurities. If a lower grade of carbon is to be used it can be suspended in water leached of impurities and washed and rinsed and dried. Amorphous carbon, graphite or various charcoals may also be used. Again the purity is a key item. Charcoal may be made for instance by the pyrolysis of carbon containing materials such as sugar. If the material is water soluble like sugar, it may be dissolved and purified, as the silicate solution is purified, to reduce the impurities to an acceptable level. The purified sugar solution is now dried and the sugar pyrolyzed to charcoal. The carbon may be further treated with chlorine. The carbon can also be made from a flammable gas such as natural gas, methane, ethane, acetylene, ethylene, propane, propene, allene, butane, LPG or in general any C1-C4 gases that are substantially free of boron and phosphorus Another factor in the efficiency of the reduction reaction in the furnace is the degree of graphitization of the carbon. This is a measure of the percent of the carbon that is in the graphite form. This may be controlled by either mixing graphite with an amorphous form of carbon or any form of carbon may be treated in a graphitization furnace to form graphite. The degree of graphitization is preferably between about 30-55%, more preferably about 40-45% but can vary depending on furnace conditions and feedstocks. Most carbons start to graphitizate at around 1200° C. in inert atmospheres or vacuum. The temperature and residence time may be varied to achieve any degree of graphitization required. Various carbon forms can be mixed to obtain the proper percentage of graphite, for example, by mixing 45% graphite with 55% carbon black.

The prepared silica and the prepared carbon may now be further modified to be suitable for the size of the arc furnace. Due to the release of large quantities of gas (mostly CO) the charge in the furnace must allow the gases to escape without building up any significant pressure. This is achieved by using briquetters to create briquettes of silica and briquettes of carbon. Several different sizes of briquettes may be created as desired to achieve smooth and efficient furnace operation.

As an alternative method, silica and carbon may be co-precipitated by the following procedure. The pure carbon can be added to the pure solution of sodium silicate and suspended carbon that is being stirred. In the presence of the carbon particles, the carbon will provide a nucleation site for the silica. This will result in the co-precipitation of a silica-carbon mixture that is very evenly and intimately mixed. If such a mixture is desired for its intimately mixed properties this or a similar methodology would be applicable.

The precipitated material is filtered (use of a centrifuge is also possible) and rinsed with DI water to eliminate any impurities that are soluble in water. The filtered material is handled via closed conveyers (so as not to let in any impurities) into a drying oven to dry the material to at least 500° C. This ensures that there is no free water available to make steam in the furnace, which could be a safety problem. Further, steam in the furnace also increases the rate of graphite electrode consumption. The powder is now conveyed directly to the briquettes as before and then added to the furnace and heated up to the reaction temperature. The reaction rate will vary with the energy input of the furnace, as the reaction is very endothermic. The sensible heat is only about 10% of the energy input the rest is for driving the reaction. This input is theoretically about 448 kJ/mole (~4.5 kWh/kG) of silicon. Most arc furnaces consume about 12 kWh/kG.

Since the silica and carbon each contains less than a ppm of any impurity the only other impurities possible are carbon and oxygen. The oxygen can be reduced by using a greater than stoichiometric amount of carbon. The carbon's solubility in molten silicon is about 20 ppm. In general carbon is inert for most photovoltaic applications and ordinarily would be acceptable. However, if the silicon is allowed to cool directionally as in an HEM or other DS furnace (usually from the bottom to the top) carbon has a good partition coefficient of 0.05 which then results in about 1 ppm of C in the finished silicon. Further, traces of suspended solids such as SiC will also be removed by the DS step. It should be noted that as an energy saving step, if higher purity is desired the melting and DS (directional solidification) should be combined so that energy is saved since the silicon will not have to be melted a second time.

As the silicon is tapped from the bottom of the furnace it should be tapped in an inert atmosphere. Several gases such as argon, helium carbon dioxide and nitrogen are suitable gases depending on the purity requirements. If tapped in air the oxygen would start to intrude into the silicon. Nitrogen too can react with silicon, but is slower than oxygen. Thus, depending on the tapping and pouring conditions nitrogen may or may not be a suitable gas. However, argon and helium have no chemical reaction at all with silicon and may always be used.

Finally, the molten silicon may be further treated with other purification methods such as steam injection to remove carbon as CO. The additional treatments in the molten state may also include the addition of rare-earth metals such as mischmetal (primarily cerium) that is active enough to form cerium carbide, nitride and oxide from carbon, nitrogen or oxygen that may be in the silicon. This carbide will then be removed during the DS step to follow for wafer manufacture. All the rare earth elements have very low partition coefficients and can be efficiently removed in the subsequent DS step.

Other advantages of the proposed invention will be obvious to those skilled in the art. For instance, it is easy to do large-scale treatment of the silicate solution and economies of scale can be obtained. It should also be noted that the high purity silica obtained would also be an excellent feedstock for the aluminothermic process to make silicon. Again, as before fine aluminum particles could be suspended in the silicate solution and then the silica precipitated around the aluminum. Or the high purity silica can be precipitated separately and then mixed with the reducing metal such as aluminum or magnesium. However, the metals would have to be checked for impurities.

Other adaptations are as follows. Pure silica is often available in what is called fumed silica from several mineral processing industries such fumed silica can also be a suitable feedstock for this process.

The source of carbon can also be varied. For instance ordinary table sugar can be used. The sugar is heated to decompose all of the sugar to a pure carbon. If the sugar requires removal of boron or other impurities a water solution of it can be made and purified in the exact same way as the silicate solution is purified. The water is evaporated and the sugar is pyrolyzed Any material that can be pyrolyzed to a pure form of carbon may also be used in this invention. Such other materials include many foodstuffs such as starches, celluloses, oils glycerin and rice hulls.

The following examples illustrate certain aspects of the present invention, and are not intended to limit the scope of the invention as defined by the appended claims.

EXAMPLE 1

10.0 grams of sodium silicate was dissolved in 200 milliliters of de-ionized water. The pH of the solution was 11.2 The sample was analyzed for boron using both Inductively Coupled Plasma (ICP) as well as HACH wet boron determination methods using BoroTrace™ 3 reagent. The starting boron content was 4 parts per million by weight. The original solution was passed through a 50 milliliter resin column containing Rohm & Haas, Amberlite® IRA-743-A chelating resin. The resin uses moiety that specially attracts boron. Other companies make a similar suitable resin which may also be used in this application. The column does not absorb silicate or sodium ions. A 75 milliliter fraction was collected and analyzed for boron. The boron was reduced to 0.1 ppm.

EXAMPLE 2

10.0 grams of sodium silicate was dissolved in 200 milliliters of de-ionized water. The pH of the solution was 11.2 The sample pH was adjusted to 10.0 with sulfuric acid. The sample was analyzed for boron using both Inductively Coupled Plasma (ICP) as well as HACH wet boron determination methods using BoroTrace™ 3 reagent. The starting boron content was 4 parts per million by weight. The original solution was passed through a 50 milliliter resin column containing Rohm & Haas, Amberlite® IRA-743-A chelating resin. The resin uses moiety that specially attracts boron. Other companies make a similar suitable resin which may also be used in this application. The column does not absorb silicate or sodium ions. A 75 milliliter fraction was collected and analyzed for boron. The boron was reduced to 0.09 ppm.

EXAMPLE 3

10.0 grams of sodium silicate was dissolved in 200 milliliters of de-ionized water. The pH of the solution was 11.2 The sample pH was adjusted to 10.0 with sulfuric acid. The sample was analyzed for boron using both Inductively Coupled Plasma (ICP) as well as HACH wet boron determination methods using BoroTrace™ 3 reagent. The sample was intentionally spiked with 12.0 milligrams of boric acid. The starting boron content was 15 parts per million by weight. The original solution was passed through a 50 milliliter resin column containing Rohm & Haas, Amberlite® IRA-743-A chelating resin. The resin uses moiety that specially attracts boron. Other companies make a similar suitable resins that may also be used in this application. The column does not absorb silicate or sodium ions. A 75 milliliter fraction was collected and analyzed for boron. The boron was reduced to 0.1 ppm.

EXAMPLE 4

10.0 grams of sodium silicate was dissolved in 200 milliliters of de-ionized water. The pH of the solution was 11.2 The sample pH was adjusted to 10.5 with sulfuric acid. The sample was analyzed for boron using both Inductively Coupled Plasma (ICP) as well as HACH wet boron determination methods using BoroTrace™ 3 reagent. The starting boron content was 4 parts per million by weight. The original solution was passed through a 50 milliliter resin column containing Rohm & Haas, Amberlite® IRA-743-A chelating resin. The resin uses moiety that specially attracts boron. Other companies make a similar suitable resin which may also be used in this application. The column does not absorb silicate or sodium ions. A 75 milliliter fraction was collected and analyzed for boron. The boron was reduced to less than 0.04 ppm the detection limit of the ICP method.

EXAMPLE 5

The sample from Example 1 was acidified with sulfuric acid to pH 7.0. The solution was allowed to stand for ten minutes during which time a silica gel formed. The gel was washed with DI water, filtered and dried. The gel was analyzed for boron and it contained 0.15 ppm B.

EXAMPLE 6

The sample from Example 4 was acidified with sulfuric acid to pH 7.0. The solution was allowed to stand for ten minutes during which time a silica gel formed. The gel was washed with DI water, filtered and dried. The gel was analyzed for boron and it contained 0.05 ppm B.

EXAMPLE 7

1000 kilograms of sodium silicate is dissolved in 20000 liters of de-ionized water. The pH of the solution is 11.2. The sample pH is adjusted to 10.5 with sulfuric acid. The sample is analyzed for boron using both Inductively Coupled Plasma (ICP) as well as HACH wet boron determination methods using BoroTrace™ 3 reagent. The original solution is passed through a 500 liter resin column containing Rohm & Haas, Amberlite® IRA-743-A chelating resin. The resin uses moiety that specially attracts boron. Other companies make a similar suitable resin which may also be used in this application. The column does not absorb silicate or sodium ions. A entire fraction is collected and analyzed for boron. The solution from the column is now treated with sulfuric acid until the pH is 7.0. After standing a gel forms which is filtered and dried at up to 1400 C. The dried material is briquetted into briquettes of several sizes from about 2-6 inched on edge. Separately, 1000 kilograms of sugar is dissolved in 2000 liters of DI water the solution is passed through a 500 liter resin column containing Rohm & Haas, Amberlite® IRA-743-A chelating resin. The resin uses moiety that specially attracts boron. Other companies make a similar suitable resin which may also be used in this application. The water is evaporated to recover the sugar which is then pyrolyzed at 1200 C in an inert atmosphere until the degree of graphitization is about 45%, resulting in 400 kilograms of carbon. This material is briquetted into briquettes of several sizes from about 2-6 inched on edge. The carbon briquettes and the silica briquettes are feed into a submerged arc furnace. The furnace is heated to over 1700 C and after 5 hours silicon metal starts to collect at the bottom. The silicon metal is periodically tapped from the bottom of the furnace as needed. As the silicon is tapped additional briquettes of silica and carbon (made as above) may be added to operate the furnace continuously for months at a time. The bottom tap and conduit for the molten silicon is covered by an inert atmosphere of argon maintained in a box covering the bottom tap, conduit and molds for allowing the silicon to cool. After the silicon has solidified the mold may be removed from the inert atmosphere. The silicon is then allowed to crack or is crushed and bagged in a suitable container for shipping.

Alternatively, the molten silicon may be poured into a preheated crucible suitable for going directly into a directional solidification furnace and then solidified according to the cooling profile of the furnace. This step will save considerable energy and time use on the DS furnace since time and energy are not wasted on solidifying and then re-melting the same silicon. This method will also be useful for forming mono-crystalline silicon through CZ pulling as well.

EXAMPLE 8

1000 kilograms of sodium silicate is dissolved in 20000 liters of de-ionized water. The pH of the solution is 11.2 The sample pH is adjusted to 10.5 with sulfuric acid. The sample is analyzed for boron using both Inductively Coupled Plasma (ICP) as well as HACH wet boron determination methods using BoroTrace™ 3 reagent. The original solution is passed through a 500 liter resin column containing Rohm & Haas, Amberlite® IRA-743-A chelating resin. The resin uses moiety that specially attracts boron. Other companies make a similar suitable resin which may also be used in this application. A entire fraction is collected and analyzed for boron. The solution from the column is now treated with sulfuric acid until the pH is 7.0. After standing a gel forms which is filtered and dried at up to 1400° C. The dried material is briquetted into briquettes of several sizes from about 2-6 inched on edge. 400 kilograms of carbon black made from natural gas is dissolved in 2000 liters of DI water the solution is passed through a 500 liter resin column containing Rohm & Haas, Amberlite® IRA-743-A chelating resin. The resin uses moiety that specially attracts boron. Other companies make a similar suitable resin which may also be used in this application. The water is evaporated to recover the sugar which is then pyrolyzed at 1200° C. in an inert atmosphere until the degree of graphitization is about 45%, resulting in 400 kilograms of carbon. This material is briquetted into briquettes of several sizes from about 2-6 inched on edge. The carbon briquettes and the silica briquettes are feed into a submerged arc furnace. The furnace is heated to over 1700° C. and after 5 hours silicon metal starts to collect at the bottom. The silicon metal is periodically tapped from the bottom of the furnace as needed. As the silicon is tapped additional briquettes of silica and carbon (made as above) may be added to operate the furnace continuously for months at a time. The bottom tap and conduit for the molten silicon is covered by an inert atmosphere of argon maintained in a box covering the bottom tap, conduit and molds for allowing the silicon to cool. After the silicon has solidified the mold may be removed from the inert atmosphere. The silicon is then allowed to crack or is crushed and bagged in a suitable container for shipping.

Alternatively, the molten silicon may be poured into a preheated crucible suitable for going directly into a directional solidification furnace and then solidified according to the cooling profile of the furnace. This step will save considerable energy and time use on the DS furnace since time and energy are not wasted on solidifying and then re-melting the same silicon. This method will also be useful for forming mono-crystalline silicon through CZ pulling as well.

EXAMPLE 9

1000 kilograms of sodium silicate is dissolved in 20000 liters of de-ionized water. The pH of the solution is 11.2 The sample pH is adjusted to 10.5 with sulfuric acid. The sample is analyzed for boron using both Inductively Coupled Plasma (ICP) as well as HACH wet boron determination methods using BoroTrace™ 3 reagent. The original solution is passed through a 500 liter resin column containing Rohm & Haas, Amberlite® IRA-743-A chelating resin. The resin uses moiety that specially attracts boron. Other companies make a similar suitable resin which may also be used in this application. A entire fraction is collected and analyzed for boron. The boron is reduced to less than 0.04 ppm the detection limit of the ICP method. The solution from the column is now treated with sulfuric acid until the pH is 7.0. After standing a gel forms which is filtered and dried at up to 1400 C. The dried material is briquetted into briquettes of several sizes from about 2-6 inched on edge. Separately, 1000 kilograms of sugar is dissolved in 2000 liters of DI water the solution is passed through a 500 liter resin column containing Rohm &

Haas, Amberlite® IRA-743-A chelating resin. The resin uses moiety that specially attracts boron. Other companies make a similar suitable resin which may also be used in this application. The solution has 0.01 ppm of Boron. The water is evaporated to recover the sugar which is then pyrolyzed at 1200 C in an inert atmosphere until the degree of graphitization is about 45%, resulting in 400 kilograms of carbon. This material is briquetted into briquettes of several sizes from about 2-6 inched on edge. The carbon briquettes and the silica briquettes are feed into a submerged arc furnace. The furnace is heated to over 1700 C and after 5 hours silicon metal starts to collect at the bottom. The silicon metal is periodically tapped from the bottom of the furnace as needed. As the silicon is tapped additional briquettes of silica and carbon (made as above) may be added to operate the furnace continuously for months at a time. The bottom tap and conduit for the molten silicon is covered by an inert atmosphere of argon maintained in a box covering the bottom tap, conduit and molds for allowing the silicon to cool. After the silicon has solidified the mold may be removed from the inert atmosphere. While the silicon is still molten approximately 10 ppm, (15 grams) Misch metal is added and stirred into the silicon. When the silicon is directionally solidified the rare earth metal will be transferred to the cold end (usually the top) of the DS product along with impurities such as boron, oxygen. Nitrogen and oxygen resulting in an even higher purity silicon. The silicon is then allowed to crack or is crushed and bagged in a suitable container for shipping. Alternatively, the molten silicon may be poured into a preheated crucible suitable for going directly into a directional solidification furnace and then solidified according to the cooling profile of the furnace. This step will save considerable energy and time use on the DS furnace since time and energy are not wasted on solidifying and then re-melting the same silicon. This method will also be useful for forming mono-crystalline silicon through CZ pulling as well.

What is claimed is:

1. A method for producing a solar cell including a photovoltaic component made from solar grade silicon, the solar grade silicon manufactured according to a method comprising:
    (a) providing an aqueous solution of a water soluble form of silica;
    (b) treating the water soluble form of silica with a boron specific chelating resin in a basic condition, wherein the boron specific chelating resin is an ion exchange resin having a functional group of N-methylglucamine;
    (c) converting the treated water soluble form of silica of (b) to purified silica, wherein the purified silica has boron content of about 5 ppm or less, and
    (d) reducing the purified silica using a reducing agent to produce solar grade silicon.

2. The method according to claim 1, wherein the method of manufacturing the solar grade silicon further comprises adding a transition metal, calcium or magnesium to the aqueous solution of the water soluble form of silica, followed by filtering the aqueous solution of the water soluble form of silica before (c).

3. The method according to claim 1, wherein the method of manufacturing the solar grade silicon further comprises treating the aqueous solution of a water soluble form of silica with molybdate salt or molybdate salt treated anion resin before (c).

4. The method according to claim 1, wherein the water soluble form of silica is an alkali silicate.

5. The method according to claim 1, wherein the reducing agent is carbon containing less than 5 ppm of boron and phosphorus.

6. The method according to claim 1, wherein the method of manufacturing the solar grade silicon further comprises filtering the aqueous solution of the water soluble form of silica to remove solid impurities after (a) and before (c).

7. The method of claim 1, wherein the method of manufacturing the solar grade silicon further comprises treating the aqueous solution of the water soluble form of silica with an anion exchange resin that is pre-treated with ammonium molybdate or tungstate before (c).

8. The method of claim 1, wherein the purified silica has a boron content of about 1 ppm or less.

9. The method of claim 1, wherein the purified silica has a boron content of about 0.5 ppm or less.

10. The method of claim 1, where the reducing agent is an active purified metal selected from one of aluminum and magnesium.

* * * * *